(12) United States Patent
De Groot

(10) Patent No.: US 6,465,992 B2
(45) Date of Patent: Oct. 15, 2002

(54) PRECONDITIONER GENERATING FEEDBACK SIGNAL HAVING REDUCED RIPPLE

(75) Inventor: Humphry Rene De Groot, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/011,613

(22) Filed: Dec. 6, 2001

(65) Prior Publication Data

US 2002/0097591 A1 Jul. 25, 2002

(30) Foreign Application Priority Data

Dec. 13, 2000 (EP) .............................................. 00204486

(51) Int. Cl.[7] ................................................. G05F 1/10
(52) U.S. Cl. ............................. 323/222; 363/86; 363/46
(58) Field of Search ................................. 323/222, 254, 323/263, 282, 271, 223; 363/89, 86, 44, 45, 46, 47, 48

(56) References Cited

U.S. PATENT DOCUMENTS

| 5,572,416 A | * | 11/1996 | Jacobs et al. ................ 323/222 |
| 5,793,625 A | * | 8/1998 | Balogh ......................... 323/222 |
| 5,867,379 A | * | 2/1999 | Maksimovic et al. ........ 323/222 |

* cited by examiner

Primary Examiner—Shawn Riley

(57) ABSTRACT

A preconditioner comprises a rectifier, a switch mode power supply, and a feedback path for feedback of a preconditioner output voltage to a control block. The rectifier is arranged to receive an AC voltage from a voltage supply and to rectify the AC voltage. The switch mode power supply is arranged to control the current in the rectifier. The control block has a bandwidth equal to or greater than the voltage supply frequency. The feedback path has a bandpass filter connected to the output voltage and generates a feedback signal based on the output voltage and an output signal from the bandpass filter. The feedback signal has reduced ripple around the passband of the filter.

7 Claims, 2 Drawing Sheets

PRECONDITIONER GENERATING FEEDBACK SIGNAL HAVING REDUCED RIPPLE

FIELD OF THE INVENTION

The present invention relates to a preconditioner, a rectifier arranged to receive an AC voltage from a voltage supply and to rectify said AC voltage, a switch mode power supply arranged to control the current in the rectifier, and a feedback path for feedback of a preconditioner output voltage to a control block, said control block having a bandwidth equal to or greater than the voltage supply frequency. Such a preconditioner can advantageously be implemented in any electronic apparatus meeting the IEC61000-3-2 requirements, e.g. in a TV set.

BACKGROUND AND SUMMARY OF THE INVENTION

To get a relatively constant DC output voltage from an oscillating (normally sinusoid) voltage source, this voltage is usually rectified with a rectifier bridge consisting of four diodes and a capacitor. Such a simple solution results in an AC line input current with a high harmonic content, as the peak current is high as the charge time of the capacitor is short. This also leads to undesired losses in the rectifier. Therefore, efforts have been made to generate a more harmonic AC line current. A preferred solution is to introduce a switch mode power supply (SMPS), and to arrange a suitable control of the SMPS. The input current to the SMPS can be sinusoidal (e.g. with the help of a Power Factor Controller), or trapezium (block shaped). This type of systems are used today as preconditioners in different electronic appliances.

It can be shown that in a rectifier system with an AC input voltage feeding a constant power load, the output voltage from the SMPS will always have a ripple with twice the frequency of the voltage frequency. When the voltage control loop, which is designed to keep the output voltage of the preconditioner at a predefined level during any changing conditions, tries to eliminate this ripple, the desired current shape is distorted, and extra harmonics occur in the input current. In order to avoid this drawback, the frequency bandwidth of the control loop can be limited to a very low value (below 50 Hz, typically 8-10 Hz), thereby eliminating the influence of the AC source in the system. With such a low bandwidth, the ripple in the output voltage is "invisible" to the control loop, and thus no attempt is made by the control loop to reduce the ripple. However, the low bandwidth leads to a very slow system characteristics, resulting in unsatisfying response to changes in the load impedance.

Therefore, a higher bandwidth is desired in the feedback loop, preferably higher than the frequency of the AC source, i.e. normally the mains frequency, e.g. 50–60 Hz. The disadvantage with this solution is as said that the ripple on the output voltage is fed back in the feedback loop and causes the input current to the SMPS to deviate from the ideal waveform.

The object of the invention is to provide a preconditioner with high bandwidth voltage feedback, that overcomes the above stated problem.

According to the invention, this and other objects are accomplished by a preconditioner of the kind stated by way of introduction, wherein the feedback path comprises a bandpass filter connected to said output voltage, and means for generating a feedback signal based on the output voltage and an output signal from said bandpass filter, which feedback signal has reduced ripple around the passband of the filter.

The bandpass filter operates to select voltage oscillations around the passband, and this output signal is then used to form a substantially ripple free control feedback. By performing the ripple reduction with the help of a bandpass filter, the elimination of ripple can be accomplished without sacrificing the bandwidth of the control loop, enabling a fast response to sudden load changes.

By eliminating the ripple in the voltage feedback loop, the preconditioner does not waste energy in an attempt to control this ripple, which is inherently present due to the AC source.

A preconditioner according to the invention may for example be used in LCD monitors requiring an input power larger than 75 W.

According to a preferred embodiment, the means for generating a feedback signal comprises a subtractor having a first input terminal connected to said output voltage, and a second input terminal connected to said bandpass filter output signal, for generating a feedback signal equal to the difference between said output voltage and said filter output signal.

According to another preferred embodiment, the bandpass filter is an inverting filter, and the means for generating a feedback signal comprises an adder having a first input terminal connected to said output voltage, and a second input terminal connected to said bandpass filter output signal, for generating a feedback signal equal to the sum of said output voltage and said filter output signal.

The bandpass filter preferably has a center frequency ($\omega_0$) substantially equal to twice the voltage supply frequency. This causes an efficient elimination of the ripple resulting from the AC source.

According to further preferred embodiment, the bandpass filter is comprised of two separate bandpass filters having different passbands, connected in parallel and their outputs summated together. This is advantageous in preconditioners distributed over large markets, including countries having different mains frequencies. Preferably, one passband lies in the interval 90–110 Hz, and another passband lies in the interval 110–130 Hz, in order to efficiently select ripple resulting from 50 Hz or 60 Hz mains frequencies.

The switch mode power supply can for example comprise a pulse width modulator.

BRIEF DESCRIPTION OF THE DRAWING FIGURES

These and other aspects of the invention will be apparent from the preferred embodiments more clearly described with reference to the appended drawings.

DETAILED DESCRIPTION

Figure 1:
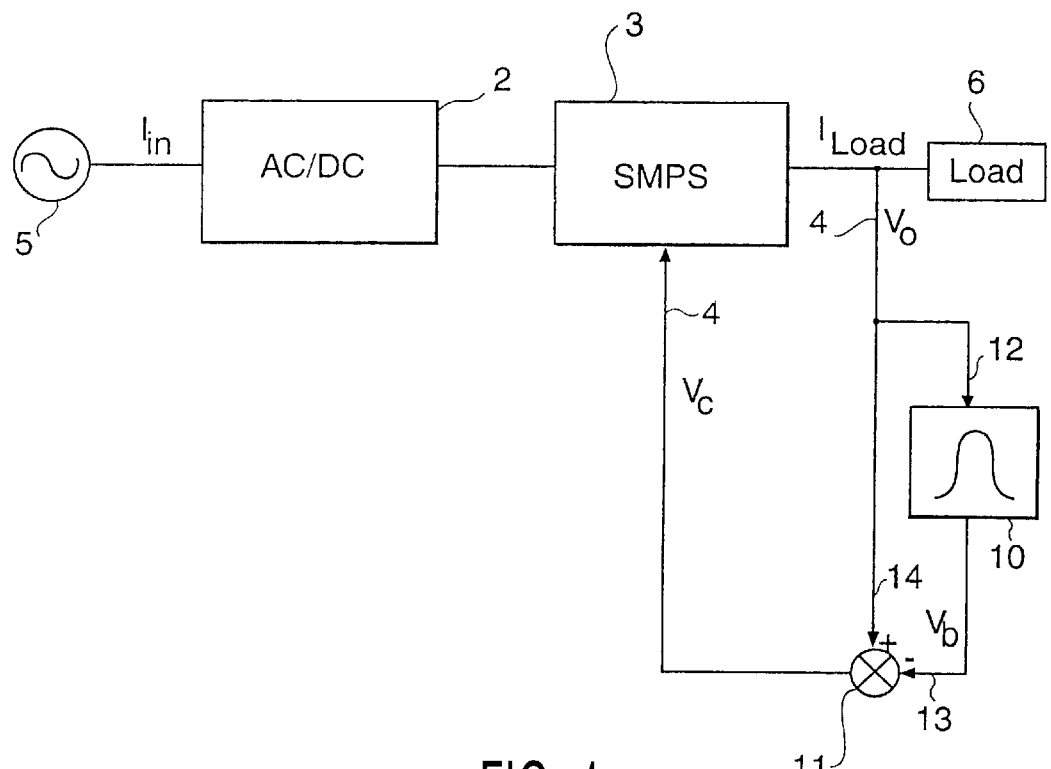
FIG. 1 is block diagram of a preconditioner according to the invention.

The preconditioner 1 illustrated in FIG. 1 comprises a rectifier 2, a switch mode power supply (SMPS) 3, including for example a Pulse Width Modulator, and a feedback path 4. The rectifier 2 receives an AC voltage ($V_{AC}$) from a source 5, preferably the mains, and delivers a DC current ($I_L$) to a load 6. The SMPS 3 controls the current through the rectifier, decreasing the harmonic content of the current. The SMPS 3 receives a voltage control signal ($V_c$) from the feedback path 4.

Figure 2:
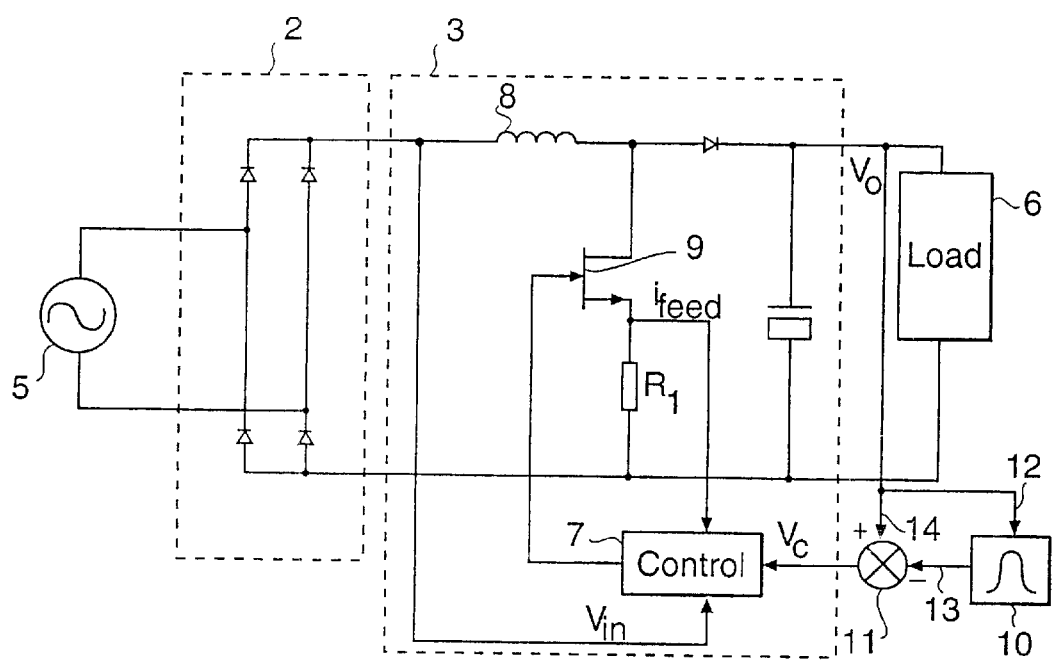
FIG. 2 is a more detailed diagram of the preconditioner in FIG. 1.

FIG. 2 shows in greater detail an example of a preconditioner 1 comprising a rectifier bridge 2 with four diodes and a coil 8, and an SMPS 3 comprising a control block 7. As is clear from FIG. 2, the control block 7 drives a switching component 9 which is connected in series with the coil 8, and receives a measurement of the current $i_{feed}$ via the current sense resistor R1. Further, a feedback path 4 supplies voltage feedback to the control block 7.

According to the invention, the feedback path 4 comprises a bandpass filter 10, and a subtractor 11. The input terminal 12 of the filter 10 is connected to the output voltage $V_o$, and its output signal ($V_b$) is connected to the negative input terminal 13 of the subtractor 11. The positive input terminal 14 of the subtractor is connected directly to the output voltage $V_0$. The output of the subtractor ($V_c$) that is provided to the control block 7 is thus equal to the output voltage $V_o$ minus the filter output $V_b$.

The bandpass filter 10 can in its most simple form have the following transfer function:

$$H(s) = k_0 \frac{\omega_0}{Q} \frac{s}{s^2 + s\frac{\omega_0}{Q} + \omega_0^2} \quad (1)$$

where
- $k_0$ is the maximum gain of the filter,
- $w_0$ is the desired band pass center frequency, chosen to be double the AC input frequency (which normally is 50 or 60 Hz),
- Q is a quality factor, affecting the width of the filter (the higher Q, the more narrow the filter), and
- s is the complex frequency.

Figure 3:
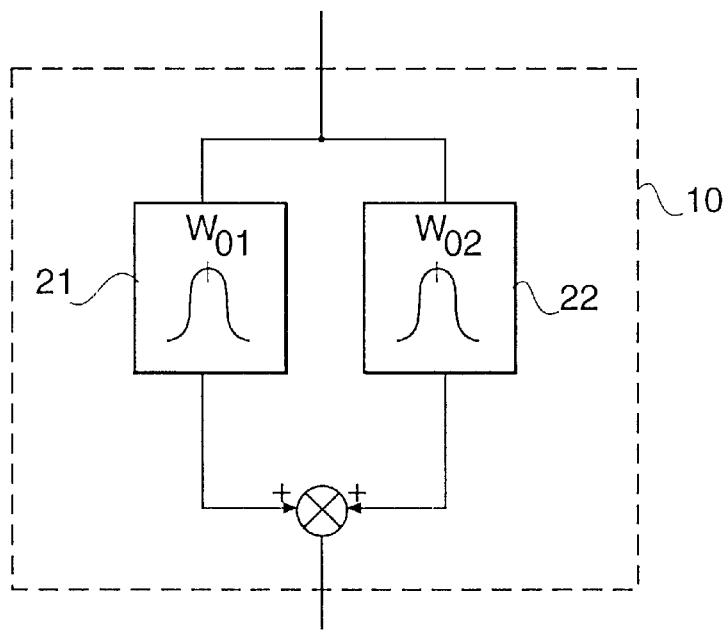
FIG. 3 is a block diagram of a possible filter design according to the invention.

The tolerance of the components in the filter, and requirements on the stability of the control loop, restrict the value of Q, and in testing a value of around 5 has been chosen. As mentioned, the desired band pass center frequency is dependent upon the frequency in the mains, and as this frequency is different in different parts of the world, it has been advantageous to develop a filter which performs its function for mains frequencies equal to both 50 Hz and 60 Hz, i.e. elimination of ripple with a frequency of 100 Hz or 120 Hz. Such a filter design is illustrated in FIG. 3.

The filter 10 in this case comprises two different bandpass filters 21 and 22, each with a standard bandpass design according to formula 1 above, but with different band pass center frequencies $\omega_{0,1}$ and $\omega_{0,2}$. To accomplish a bandpass effect with the desired characteristics, $w_{0,1}$, should be around 94 Hz and $w_{0,2}$ around 126 Hz.

An alternative design of the control loop, is to implement a phase shifting filter, and adding the filter output $V_b$ to the voltage output $V_o$ instead of subtracting it. In this case, when a double filter according to FIG. 3 is used, care has to be taken to keep the filter phase shift near 180 degrees, in order to maintain the inverting quality of the filter.

In tests, a filter consisting of two inverting bandpass filters with $\omega_{0,1}$=94,4 and $\omega_{0,2}$=126,5 resulted in an output from the filter approximately equal to ⅙ of 100 Hz ripple as well as 120 Hz ripple.

Figure 4:
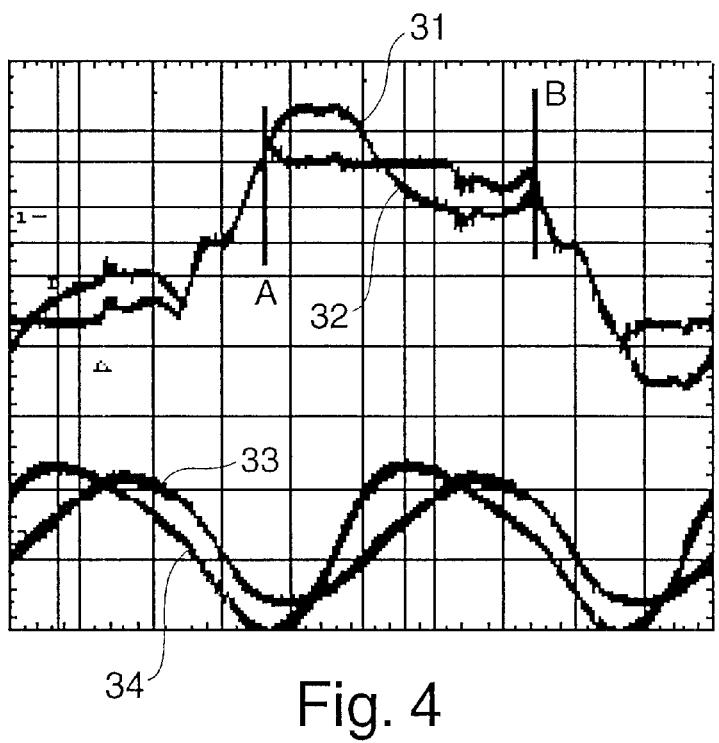
FIG. 4 is a diagram showing input currents and output voltages.

FIG. 4 is a diagram with curves representing input currents (31, 32) and output voltages (33, 34) measured with and without the feedback path according to the invention. As is clear from FIG. 4, the output voltage is essentially unchanged maintaining the 100 Hz ripple. The advantage of the invention is apparent when regarding the input currents. Without the bandpass filter, the trapezoid shape of the input current is distorted by a ripple, clearly visible between points A and B on curve 31. With the bandpass filter, on the other hand, the input current is less distorted, leading to a much more stable input current between points A and B on curve 32.

The above description is not meant to restrict the scope of the appended claims, but merely to give an example of a preferred embodiment. The skilled man will appreciate several variations from this embodiment, for example comprising different filter designs. The inventive concept, clear from the claims, is to use a bandpass filtered output voltage to reduce or eliminate the ripple in the feedback signal.

What is claimed is:

1. Preconditioner, comprising a rectifier, arranged to receive an AC voltage from a voltage supply and to rectify said AC voltage, a switch mode power supply, arranged to control the current in the rectifier, and a feedback path for feedback of a preconditioner output voltage to a control block, said control block having a bandwidth equal to or greater than the voltage supply frequency, characterized in that said feedback path comprises a bandpass filter connected to said output voltage, and means for generating a feedback signal based on the output voltage and an output signal from said bandpass filter, which feedback signal has reduced ripple around the passband of the filter.

2. Preconditioner according to claim 1, wherein the means for generating a feedback signal comprises a subtractor having a first input terminal connected to said output voltage, and a second input terminal connected to said bandpass filter output signal, for generating a feedback signal equal to the difference between said output voltage and said filter output signal.

3. Preconditioner according to claim 1, wherein said bandpass filter is an inverting filter, and said means for generating a feedback signal comprises an adder having a first input terminal connected to said output voltage, and a second input terminal connected to said bandpass filter output signal, for generating a feedback signal equal to the sum of said output voltage and said filter output signal.

4. Preconditioner according to claim 1, wherein said bandpass filter has a passband around twice the voltage supply frequency.

5. Preconditioner according to claim 1, wherein said bandpass filter is comprised of two separate bandpass filters, connected in parallel, having different center frequencies.

6. Preconditioner according to claim 5, wherein one passband lies in the interval 90–110 Hz, and another passband lies in the interval 110–130 Hz.

7. Preconditioner according to claim 1, wherein said switch mode power supply comprises a pulse width modulator.

* * * * *